No. 825,208. PATENTED JULY 3, 1906.
G. A. HANLY.
INDICATOR.
APPLICATION FILED FEB. 1, 1905.

3 SHEETS—SHEET 1.

Witnesses
Edwin G. McKee
F. S. Elmore

Inventor
George A. Hanly
By Victor J. Evans
Attorney

No. 825,208. PATENTED JULY 3, 1906.
G. A. HANLY.
INDICATOR.
APPLICATION FILED FEB. 1, 1905.
3 SHEETS—SHEET 3.
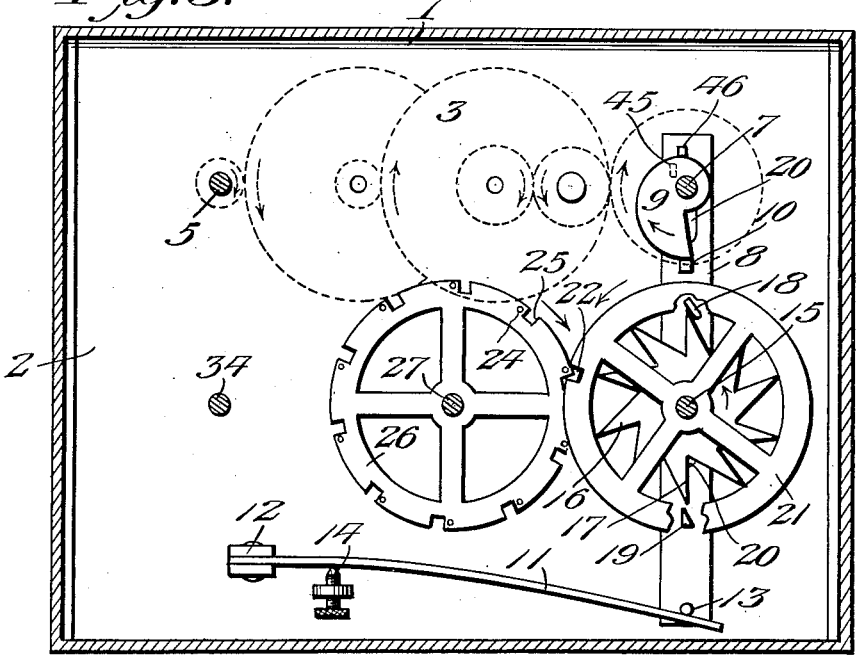
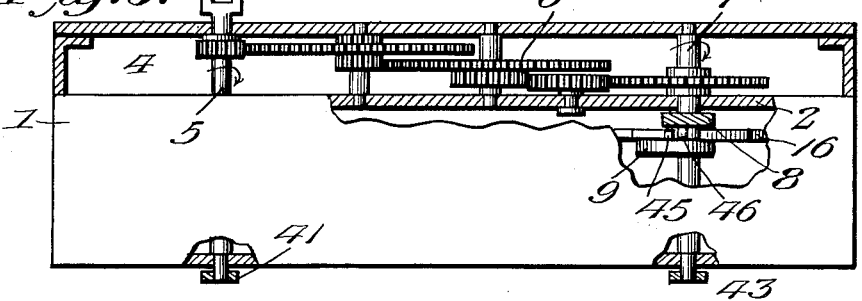
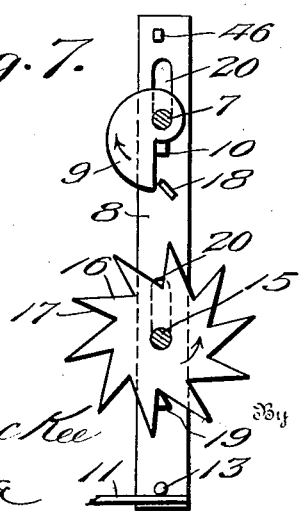
Witnesses
Edwin G. McKee
H. S. Elmore
Inventor
George A. Hanly
By Victor J. Evans
Attorney

UNITED STATES PATENT OFFICE.

GEORGE A. HANLY, OF ELGIN, ILLINOIS.

INDICATOR.

No. 825,208.　　　　　Specification of Letters Patent.　　　　Patented July 3, 1906.

Application filed February 1, 1905. Serial No. 243,742.

*To all whom it may concern:*

Be it known that I, GEORGE A. HANLY, a citizen of the United States, residing at Elgin, in the county of Kane and State of Illinois, have invented new and useful Improvements in Indicators, of which the following is a specification.

This invention relates to indicators designed especially for application to gas, water, or electric-light meters; and has for its objects to produce a simple efficient device of this character which will accurately register the amount of fluid or liquid passing through the meter and one whereby the state of the meter may be instantaneously and correctly read, thus obviating the errors which under the present practice frequently arise, together with the attendant loss involved in taking restatements.

With these and other objects in view the invention comprises the novel features of construction and combination of parts more fully hereinafter described.

Figure 1:
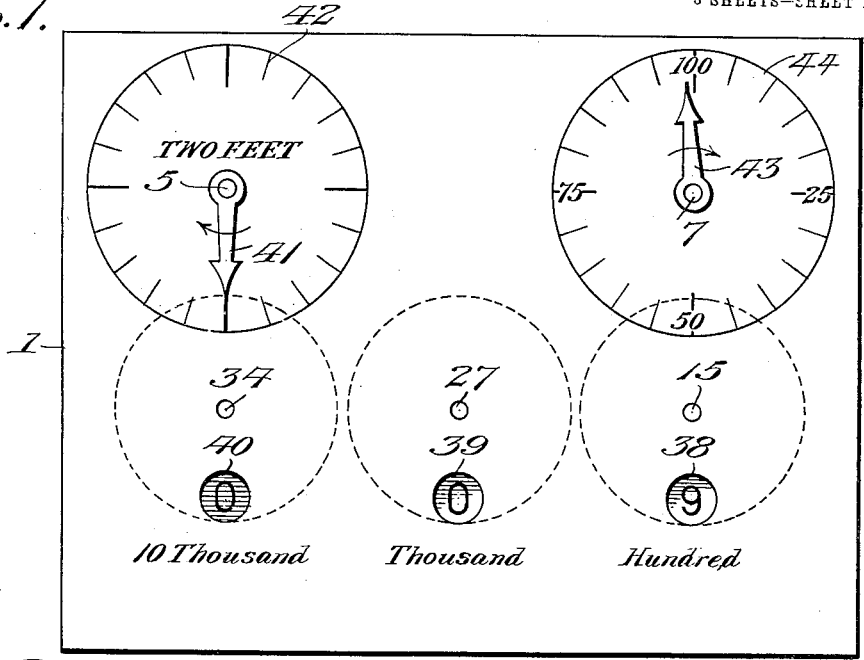
Figure 2:
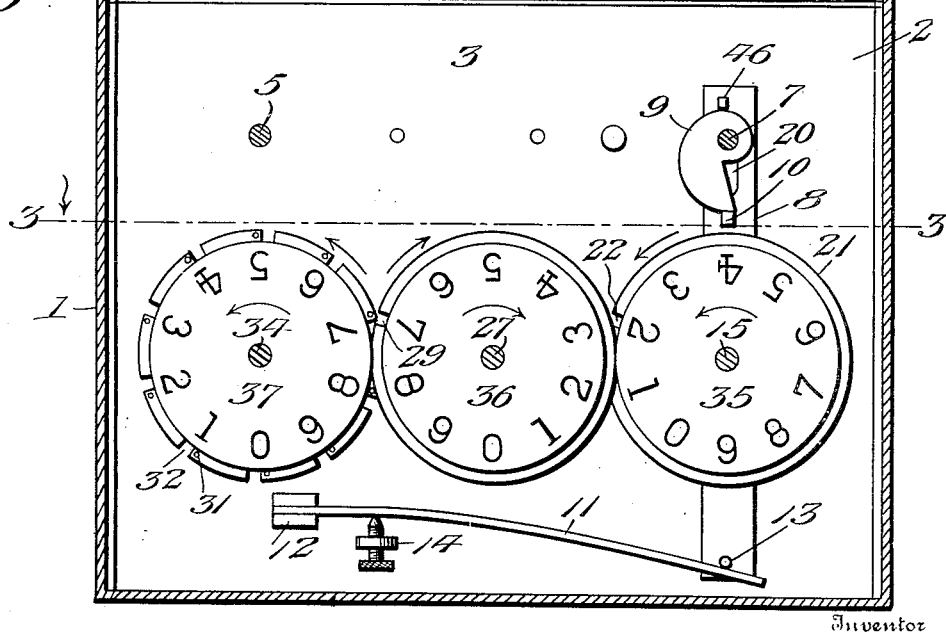
Figure 3:
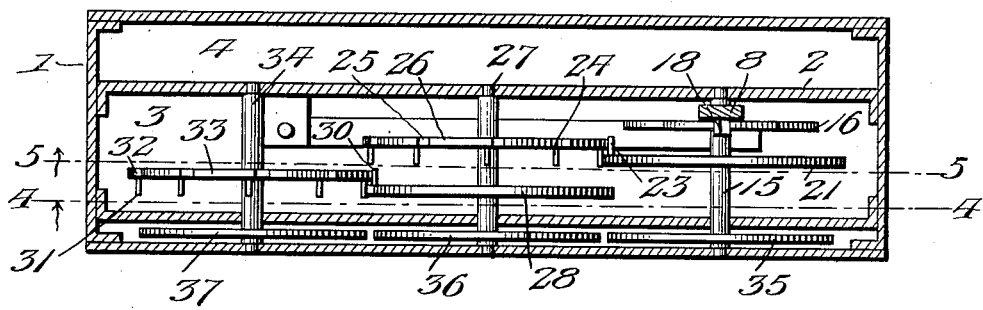
Figure 4:
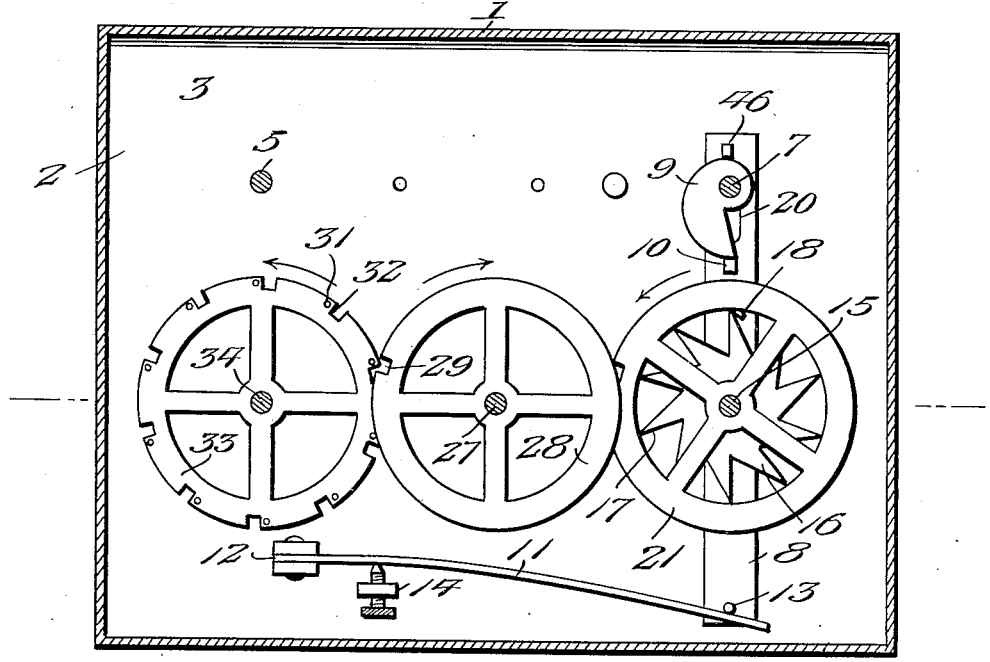

In the accompaying drawings, Figure 1 is a front elevation of an indicator embodying the invention. Fig. 2 is a similar view with the front face of the casing removed. Fig. 3 is a sectional plan taken on the line 3 3 of Fig. 2 and viewed in the direction of the arrow. Fig. 4 is a vertical sectional elevation taken on the line 4 4 of Fig. 3. Fig. 5 is a similar view taken on the line 5 5 of Fig. 3. Fig. 6 is a top plan view, partly in section and with parts of the casing broken away to expose the internal mechanism to view. Fig. 7 is a detail view of the operating member or bar and attendant parts.

Referring to the drawings, 1 designates a casing divided by an inner normally vertical partition 2 into a front compartment 3 and a rear compartment 4, there being extended transversely through the casing and journaled in suitable bearings a main or meter shaft 5, connected by a train of gears 6, located in the compartment 4, with an indicator-shaft 7.

Arranged in the compartment 3 for vertical reciprocation is an actuating bar or member 8, which moves in one direction under the influence of a cam 9, fixed upon the shaft 7 and acting upon a fixed stop or abutment 10 on the bar, the latter being movable in the opposite direction and to normal position by means of a leaf-spring 11, sustained at one end by a clamp or holder 12 within the casing and bearing at its other or free end beneath a pin or stop 13 on the bar, while within the casing is sustained an adjusting member or screw 14, designed for regulating the tension of the spring.

Fixed upon a rotary stub-shaft 15, journaled in suitable bearings in compartment 3 of the casing, is a member or star-wheel 16, formed, preferably, with ten points 17, which are acted upon to rotate the wheel step by step by reversely-inclined upper and lower contact points or projections 18 19, carried by the bar 8, which latter is slotted at suitable points 20 for the reception of the shafts 7 and 15 and to permit proper movement of the bar. There is also fixed upon the shaft 15 a gear 21, having a single peripheral notch or seat 22 and a laterally-projecting pin 23, which at every complete rotation of the star-wheel 16 engage, respectively, with one of a series of corresponding pins 24 and notches 25, provided on a gear-wheel 26, in turn carried by a rotary shaft 27, journaled in the casing for advancing said wheel 26 step by step, as will be readily understood.

Fixed upon the shaft 27 for rotation therewith is a second gear 28, having a notch 29 and a pin 30, designed for engagement, respectively, with one of a series of pins 31 and notches 32 on a gear 33, fixed upon a rotary shaft 34, journaled in the casing, whereby at the completion of each rotation of the wheel 26 the gear 33, and consequently the shaft 34, will be moved one step, while the respective shafts 15, 27, and 34 carry indicator-disks 35, 36, and 37, each bearing numerals from "1" to "10," which move successively into register with openings 38, 39, and 40 in the front wall of the casing, the disks being designed severally to register hundreds, thousands, and ten thousands cubic feet.

Fixed upon the meter-shaft 5 is a test hand or pointer 41, which, acting in conjunction with a dial 42 on the front of the casing, may register two feet in testing the indicator, while upon the shaft 7 is fixed a hand or pointer 43, adapted in conjunction with a graduated dial 44 to register from one to one hundred cubic feet.

Fixed upon the inner face of the cam 9 is a stop or abutment 45, adapted, should the spring 11 break or otherwise become defective, to engage a stop 46 on the bar 8 for checking the operation of the indicator mechanism and meter, thus shutting off supply.

In practice as the meter-shaft 5 rotates under the influence of fluid or liquid passing through the meter the shaft 7 will through the medium of the train of gears be rotated in the direction indicated by the arrow in Fig. 6, thus moving the cam 9 in the direction indicated by the arrow in Fig. 5 for forcing the bar 8 downward against the action of spring 11, which movement of the bar, together with the reverse movement imparted by the spring, causes the stops 18 and 19 to act upon corresponding points of the star-wheel 16, thereby instantly rotating the latter one step, it being understood, of course, that prior to the first step in the movement of the star-wheel and shaft 15 the shaft 7 has made one complete rotation to indicate a hundred cubic feet upon the dial 44 and that the numeral "1" then appears through the opening 38 to show one hundred cubic feet registered. After the shaft 15 has made one complete rotation the notch 22 and pin 23 through engagement with one of the pins 24 and notches 25 on the wheel 26 advances the latter one step for imparting a corresponding rotation to the shaft 27, whereupon the indicator-disk 36 will move one step and the numeral "1" appear through the opening 39 to show one thousand cubic feet registered, while in like manner a complete rotation of the shaft 27 serves, through engagement of notch 29, pin 30 and one of the pins 31, and notches 32 on the gear 33, to move the disk 37 one step, thus to expose the numeral "1" on the dial 37 through the opening 40 and indicate one ten thousand cubic feet registered, it being apparent from this arrangement that an accurate registration is attained and that the indicator may be instantaneously and correctly read.

In the operation of the device if the spring 11 breaks or becomes weakened to a sufficient degree the bar 8 will drop, thus bringing the stop 46 into the path of stop 45 on the rear face of cam 9, whereby as soon as the cam has continued its movement sufficiently to bring the stop 45 into engagement with stop 46 further movement of the cam, and consequently of shaft 7, will be prevented, thus stopping the operation of the mechanism, as before mentioned.

From the foregoing it will be seen that I produce a simple efficient device admirably adapted for the attainment of the ends in view, it being understood that minor changes in the details herein set forth may be resorted to without departing from the spirit of the invention. For example, while I have herein described the device for use as a register upon water, gas, and electric-light meters it is apparent that by slight changes in the number of teeth upon the gears 26 and 33, together with corresponding changes in the numerals on the dials 36 37, the mechanism may be readily adapted for a time-indicator.

Having thus fully described the invention, what is claimed as new is—

In a device of the class described, a plurality of dial-shafts operable one from another, a star-wheel fixed upon one of the shafts, a longitudinally-movable actuating-bar sustained adjacent to and having inclined projections adapted to act upon the points of the wheel for rotating the shaft, a bearing-lug provided on the bar, an indicator-shaft, a cam fixed thereon and adapted to act upon the bearing-lug for moving the actuating-bar in one direction, a spring arranged for moving said bar in the other direction, means for regulating the tension of the spring, a main shaft, operative connections between the same and the indicator-shaft and coöperating stop-lugs carried respectively by the actuating-bar and cam and adapted for engagement to prevent operation of the mechanism.

In testimony whereof I affix my signature in presence of two witnesses.

GEORGE A. HANLY.

Witnesses:
 CHARLES L. CARR,
 DEWEY H. WARNER.